UNITED STATES PATENT OFFICE.

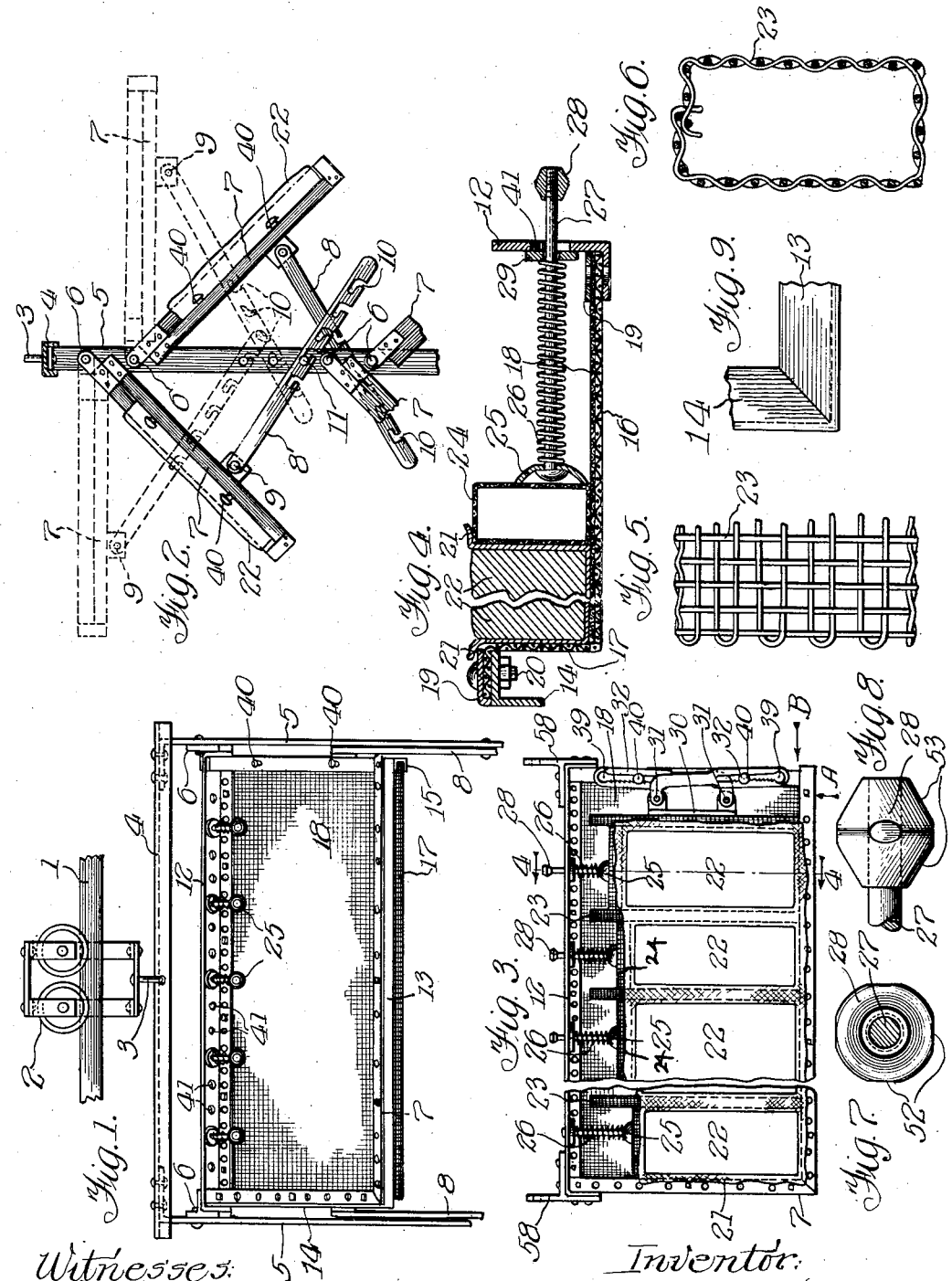

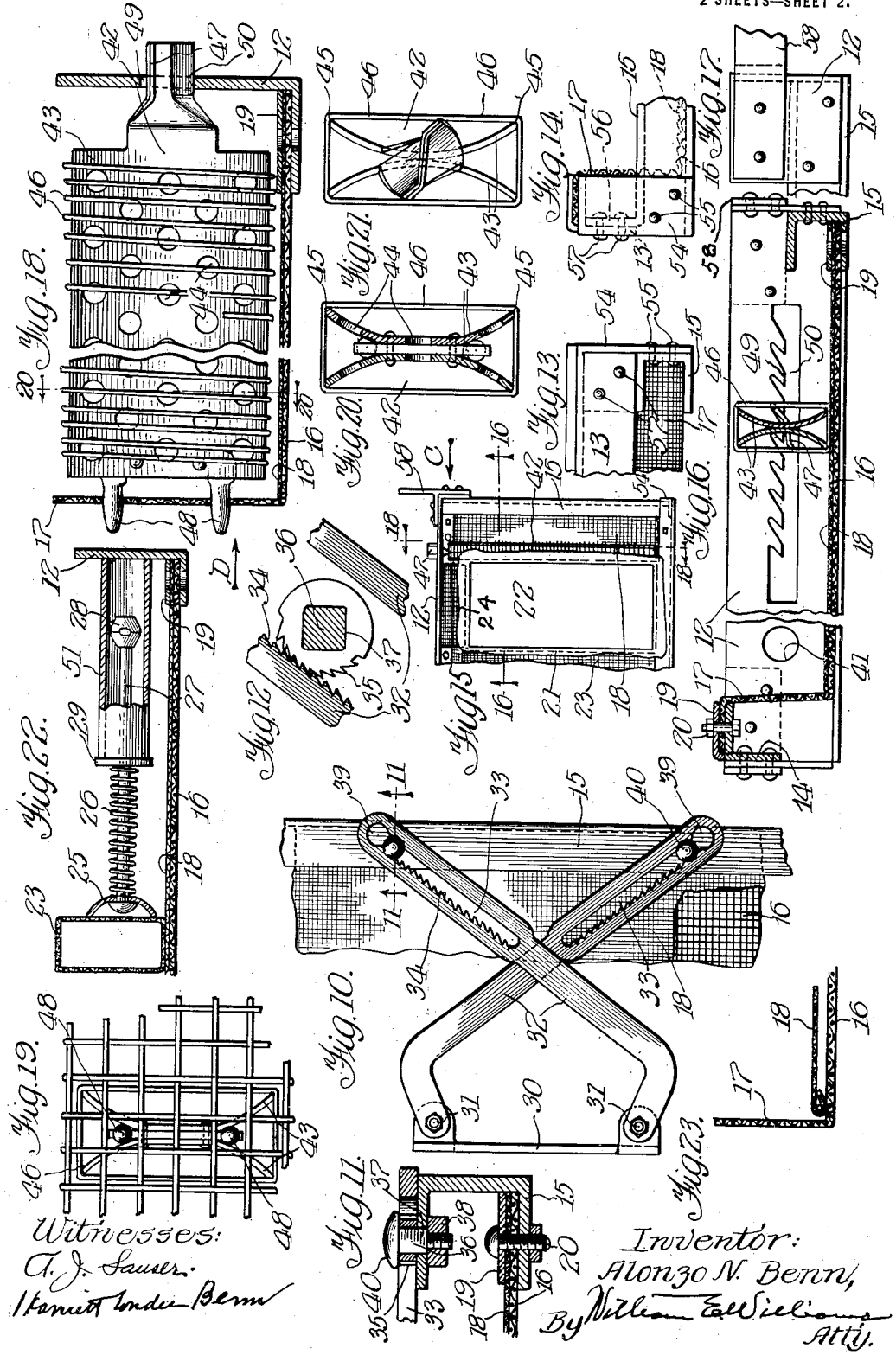

ALONZO NEWTON BENN, OF CHICAGO, ILLINOIS.

BACON-SMOKING TROLLEY.

1,360,871. Specification of Letters Patent. Patented Nov. 30, 1920.

Application filed October 26, 1916. Serial No. 127,871.

*To all whom it may concern:*

Be it known that I, ALONZO NEWTON BENN, a citizen of the United States, residing at Chicago, county of Cook and State of Illinois, have invented a new and useful Improvement in Bacon-Smoking Trolleys, of which the following is a specification.

My invention set forth in the claims relates to the mechanical means used for holding bacon and other meats in position while being smoked, dried or treated and the object of the invention is to hold the pieces of meat in form and shape in such way as to prevent losses and damage and to improve the appearance and quality of the meat.

It has been customary heretofore to hang bacon and similar pieces of meat during the smoking process by means of cords, hooks or prongs, the main body of the pieces being suspended from the fastenings at the top. When this class of meat is so held, distortions take place in its shape, leaving a more or less irregular outline to the meat and allowing irregular contractions and displacements to take place between the fatty and lean portions thereof. In many instances the lean portions dry up, shrink and contract away from the fatty portions to such an extent that some considerable trimming is made necessary when the meat is cut up for consumption and these trimmings are a more or less serious waste.

I aim to so hold the meat that it will take on a desirable rectangular shape and will be molded to such form that trimming is practically unnecessary and besides to prevent losses from undue shrinkage, burning and cracking of some portions of the meat and at the same time to expose the meat to a better action of the smoking gases and improve the flavor and quality generally.

It is the common practice in modern packing houses to smoke meats on frame-work of various kinds, which is carried on overhead trolley wheels running on over-head rails and thus almost any sort of a device of this character used in a packing house is called a trolley. I show my trolley as so supported but the same results may be arrived at independently of the trolley wheels and over-head rails.

Reference will be had to the accompanying drawings in which:

Figure 1 is the side elevation of the preferred form of my apparatus.

Fig. 2 is an end elevation.

Fig. 3 is a plan of one of my shelves for holding the meat.

Fig. 4 is a transverse sectional view on line 4—4 of Fig. 3.

Fig. 5 shows a side view of a portion of the end and Fig. 6 shows a cross-section through the body of one of the separators which I use between the pieces of meat on the shelves.

Fig. 7 is an end and Fig. 8 a side view of the nut on the outer end of one of my spring adjuster rods.

Fig. 9 shows a plan of one of the corners of the shelves.

Fig. 10 is a plan detail of the lateral adjusting mechanism on the right of the shelves.

Fig. 11 is a transverse sectional view on line 11—11 of Fig. 10.

Fig. 12 is a detail on an enlarged scale of the fastening means employed as a part of the mechanism shown in Figs. 10 and 11.

Fig. 13 is an end view of the lower right-hand corner of one of the shelves looking in the direction of the arrow A of Fig. 3.

Fig. 14 is a view at right angles to that of Fig. 13 as indicated by the arrow B of Fig. 3.

Fig. 15 shows a modified form from that shown in Figs. 10 and 11 for adjusting the meat laterally on the shelves.

Fig. 16 is a transverse sectional view of the devices shown in Fig. 15 on line 16—16 of Fig. 15.

Fig. 17 is a detail of the upper right-hand corner of Fig. 15 looking in the direction of the arrow C on Fig. 15.

Fig. 18 is a transverse sectional elevation on line 18—18 of Fig. 15 but on an enlarged scale.

Fig. 19 is a view from the left side of Fig. 18 looking in the direction of the arrow D and on a corresponding scale.

Fig. 20 is a transverse sectional view of Fig. 18 on line 20—20 of Fig. 18 but with the screen portion of the shelf removed.

Fig. 21 is an upper end view of the separator shown in Figs. 15 to 21 inclusive.

Fig. 22 is a modification of one of the spring adjusters shown in Figs. 3 and 4.

Fig. 23 is a detail showing the netting at the bottom and side of the shelf.

Instead of hanging meat of the classes that I have described, being chiefly bacon, as has heretofore been the custom, I provide shelves upon which the meat is supported and these shelves are mounted in a frame-work adapted to hold or support several shelves upon a single trolley carriage and I so mount these shelves that they may be adjusted at different angles in such manner that the action of gravity may be made to act on the meat in the direction desired.

In the drawing 1 indicates an ordinary over-head trolley track common to packing houses and smoke-houses and 2 indicates the trolley carriage, which is connected by hook 3 to the top member 4 of the framework which supports my shelves. From the top member 4 there project downward vertical members 5 to which by the hinge pins 6 are hinged my shelves 7. Adjusting bars or bracket bars 8 are hinged at 9 to the ends of the shelves and are adjustably connected by the notches 10 to studs 11 in the vertical members 5. By this arrangement 1 may adjust my shelves from dead-level positions shown in dotted lines in Fig. 2 to the inclined positions shown in full lines in the same figure.

The shelves themselves have angle and channel iron frame pieces into which there is built a bottom made of wire netting 16. The upper or horizontal portion of the frame is an angle iron 12 and the outer or lower horizonal member is also an iron indicated by 13 and the lower left-hand corner of which is shown in plan in Fig. 9. The left or rear end of the frame is shown in cross-section at the left of Fig. 16 and is also composed of an angle indicated by 14 and the right end frame member is shown in cross-section at the right of Fig. 16 and is composed of a channel member 15.

The netting 16 is arranged to become the bottom and the lower side as well of the shelves as is indicated by 17. The netting 16 is a coarse netting made of rather heavy wire for the purpose of sustaining the load on the shelves and on top of this netting I place a finer netting 18 to bridge over the coarse meshes and give an even surface for the meat to rest on.

In forming the shelves the netting is clamped in place by clamping plates 19, secured by bolts 20 to the frame member before described. The left end and the outer or bottom side of the shelves are of the same construction and conform to the left end of Fig. 16.

The right end of the frame is provided with a channel member for the purpose of providing the fastening means for the lateral adjustment devices.

Before the meat is placed on the shelves I place a cloth 21 on the bottom of the shelves on top of the netting 18 and then the pieces of meat 22 are placed on the cloth with the flesh side downward and the skin upward but I separate the pieces of meat by means of what I call a separator 23, a preferred form of which is shown in Figs. 5 and 6. This is simply what might be termed a hollow block made of wire netting and lies on the screen 18 between the pieces of meat but the cloth 21 is made to cover the blocks or separators and separate the meat from direct contact therewith.

Members constructed of wire netting similar to that described as the separators 23 are indicated by 24 and are short and are located at the inner or upper side of the shelves and are made to press against the meat at these points through the means of spring adjusters composed of the foot pieces 25, springs 26, rods 27, nuts 28 and washers 29.

At the right end of shelves I provide lateral adjusting means composed of a bearing block 30, hinged at 31 to the links 32 provided with slots 33 having ratchet teeth 34 which engage notches 35 on the body of studs 36 secured into the channel frame member 15 by means of squared portions 37 passing through square holes in the top flange of the channel member and held in place by nut 38 on the threaded ends of the studs. In the ends of the arms 32 at the terminations of the slots 33 I provide holes 39 slightly larger than the heads 40 of the studs 36. This permits the lateral adjusting device to be easily removed or replaced on the shelf as desired by simply lifting it off from the studs through the holes 39 at the end of the arms.

In the use of my invention the meat is assembled on the shelves in loose relationship as relates to the several pieces and the several separators, with a cloth covering the meat on all of its fleshy sides and lying between it and the netting and separators, and then there is placed in position the lateral adjusting means composed of the block 30 and its connections and the meat is thus pressed laterally or horizontally toward the left end of the shelf by the pressure of the hands of the operator on the block 30, locking the position of the block when home by means of the ratchet teeth 34 engaging the notches 35 of the stud as described. Sufficient pressure is put upon the meat and maintained thereon to make it conform to straight lines on its sides in conformity with the shape of the separators. When the lateral adjustment is suitably completed the spring adjusters are placed at the top or inner ends of the meat and these adjusters are put in place by having the upper ends or nuts 28 pass through the holes 41 in the frame piece 12 and as the washers 29 are larger than the holes 41, they prevent the springs 26 from passing through the holes 41 and thus the springs are compressed and force the foot pieces 25 against the members 24 which in turn press the ends of the meat to shape. The other ends of the pieces of meat are thus also shaped by being pressed against the outer or bottom side 17 of the shelves. The inclination of the shelves themselves causes gravity to act on the meat to bring it down at the lower ends against the side of the shelves and thereby assist in shaping it to desired form.

Since the meat is held on the bottom and at its edges by means of the wire netting forming the bottom, side and end of the shelves and the wire netting in the form of separators 23 and members 24, free access is given the smoking gases through the meshes of the netting and complete ventilation is obtained at all times on all slides of the meat. The cloth covering the fleshy portions acts as a counter-balance to the skin-covered portions, thus bringing about a more or less uniform smoking action on the meat.

The character of the netting is such that when the cloth is interposed between it and the meat, no marks are left on the meat that in any way discolor or injure the surface as is the case when some of the means now in use are employed.

The meat when prepared ready to be smoked has not yet taken on what might be termed any permanent set as to shape but in the smoking process the meat is more or less dried out and set does take place to a considerable extent between the different fibers of the meat and while the meat when ready to be smoked may have a more or less irregular outline, it is capable of being shaped on my shelves as indicated to have substantially regular sides and ends approaching parallelograms in shape and when the smoking is completed sufficient set will have taken place to cause the meat to retain the shape thus given it and thus a much more desirable product is obtained.

However carefully the meat is cut and trimmed when fresh, its edges when ready to be smoked are more or less irregular and portions are sure to be damaged by undue shrinkage, burning and cracking of some of the parts, but with my apparatus holding the meat in shape, these injuries are avoided. The old method of holding the meat always left marks, holes and distortions which contributed to prevent the high quality of product which I obtain with my apparatus.

Figs. 15 to 21 inclusive show a modified form of devices for accomplishing the lateral adjustment from what has before been described and set forth in Fig. 10. In place of the block 30 pressing against a separator 23 I provide a peculiarly constructed block or lateral abutment piece 42 which is a ventilated member itself and bears directly in contact with the meat cloth on the meat.

This abutment piece 42 is made of two perforated plates 43 perforations 44 for ventilation and they serve only as a frame work, furnishing corners 45 around which wire 46 is coiled to produce a netting effect to conform to the ventilated features of the separators 23. The right end of this abutment piece 42 is cut away and shaped to provide a peculiarly shaped locking lip 47 somewhat after the manner of the pawl of a ratchet, while the other end of the abutment member is provided with two rounded end pins 48 secured into the ends of the plates 43. The rounded ends of pins 48 are adapted to engage in the meshes of the netting at the side 17 of the shelf and thus hold the abutment in position at that end, while the locking lip 47 is adapted to engage some teeth 49 made in the edge of a slot 50 in the right end of the frame piece 12, thus by shifting the pins 48 laterally from mesh to mesh and the lip 47 from notch to notch of the teeth 49, a lateral pressure is exerted on the meat in a similar manner to the means first above described for the purpose. In doing this work with the abutment block it is convenient to first put forward the end with its pins 48 into the desired meshes of the netting and then adjust forward the lip or pawl 47 from notch to notch of the teeth.

When bacon or meat is placed on the shelves that is so short in length as to require an extra length of spring adjuster from that shown in Figs. 3 and 4, I piece out the length of the adjuster as it were by using short pieces of tubes 51 as indicated in Fig. 22. The nuts 28 of the spring adjuster are round in outline but provided with flat spots 52 to assist in screwing them on to the end of the rod. In order to facilitate their entrance and removal from the holes 41 of the frame piece 12, the nuts are made with inclined surfaces 53, see Figs. 7 and 8.

While any suitable means may be employed for fastening the frame pieces together at the corners, I have shown the flanges of some of the members as cut away, leaving another flange which I bend in the corner and make it act as an angle piece in forming the corner fastening. In Fig. 13 the frame piece 13 has its end 54 so bent as described and is secured by the rivets 55 to the channel piece 15. Correspondingly a flange 56 of channel 15 shown in dotted lines in Figs. 13 and 14 is bent up and riveted at 57 to the angle 13.

The shelves are connected to the hinge pins 6 through the medium of the hinge blocks 58 secured to the corners of the shelves by rivets or other suitable means.

While I have shown the forms which I prefer to use, more or less variations in shape or construction are permissible and may accomplish substantially the same results, the purpose being to provide means to act on the meat to obtain the desired shape and quality of the products.

What I claim is:

1. In devices of the class described, the combination with a ventilated shelf for holding meat and ventilating separators for spacing pieces of meat on the shelf, of means for applying to such pieces forming pressure parallel to the shelf.

2. In apparatus of the class described, the combination with a meat supporting shelf through which gaseous fluids may readily pass, of means for pressing toward each other, parallel to the shelf, opposite margins of pieces of meat resting thereon, and means for similarly pressing other margins in a direction parallel to the shelf and transverse to the direction of the pressure first mentioned.

3. The combination with a plane, foraminous meat-supporting shelf having a marginal upwardly extending foraminous meat-forming wall to limit the movement of meat thereon while allowing curing gases free access to the lower and marginal faces of meat upon the shelf.

4. The combination with a ventilated meat-supporting shelf having an upwardly extending, meat-forming, ventilated marginal member, of ventilated meat-forming separators to space pieces of meat on the shelf, and means for forming otherwise exposed margins of the meat while it is being treated.

5. The combination with a ventilated meat-supporting shelf, of means for applying yielding pressure, parallel to the shelf, to the marginal faces of pieces of meat upon the shelf.

6. The method of holding meat while curing it which consists in subjecting certain faces of the meat to forming inwardly acting pressure during the curing while permitting free access of the curing agent to each of said faces.

7. In a device of the class described, a shelf for holding meat, devices attached to a margin of the shelf for applying pressure to the edges of the pieces of meat on the shelf.

8. An apparatus for supporting meat in the smoking and drying process, composed of a ventilated frame-work upon which the meat is placed and held in position by gravity, ventilated movable separators adapted to lie between the pieces of meat on the shelves and assist in holding and shaping the pieces of meat in contact therewith.

9. An apparatus for holding and supporting meat in the smoking and drying process, composed of a shelf having a ventilated bottom and ventilated marginal sides, with spring-actuated means for pressing against the edges of the pieces of meat in one direction and adjustable means adapted to press against the edges of the pieces of meat in the other direction while on the shelf during the smoking and drying.

10. An apparatus for supporting meat during the smoking and drying process, composed of a shelf having a ventilated bottom and provided with marginal side walls, one side and one end of said walls also ventilated; with means attached to the other side walls for holding pressure against the meat on the shelf and hold it over against the ventilated side and end of the side walls of the shelf.

Signed in Chicago, in the State of Illinois and the county of Cook this 21 day of October, 1916.

ALONZO NEWTON BENN.

Witnesses:
HARRIETT CONDEE BENN,
MARY L. WILLIAMS.